H. A. WILBERG.
COMBINATION ATTACHMENT FOR PLOWS.
APPLICATION FILED SEPT. 9, 1910.
1,005,389.
Patented Oct. 10, 1911.
2 SHEETS—SHEET 2.
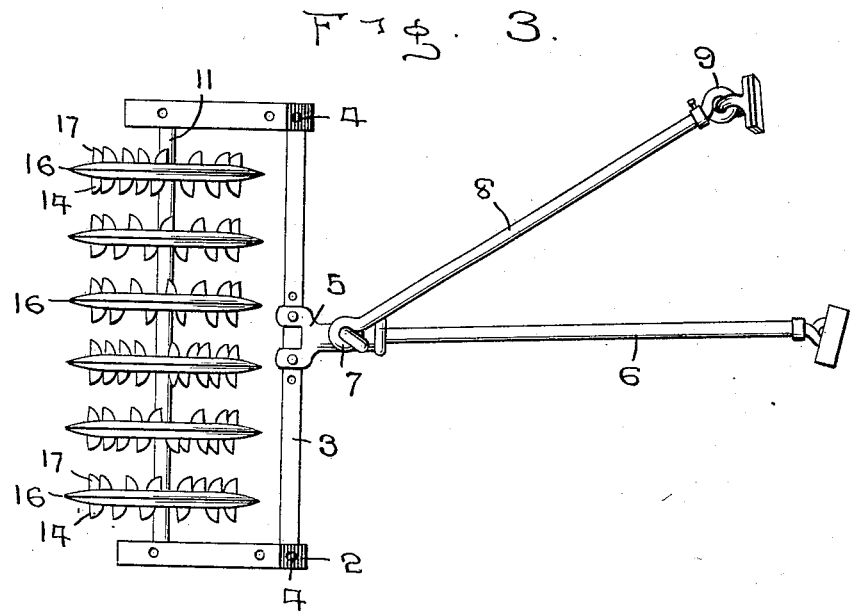
WITNESSES:
INVENTOR
H. A. Wilberg
BY
Attorneys

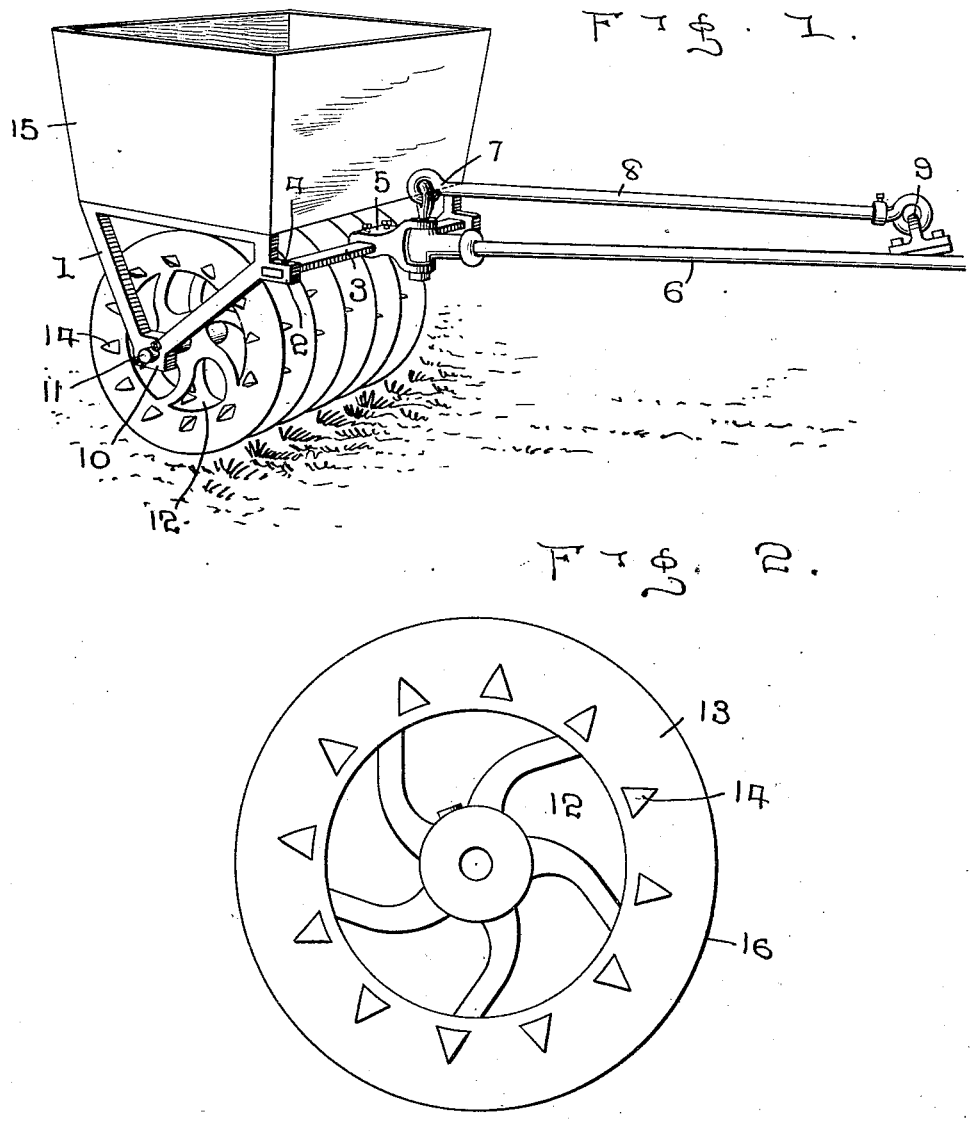

UNITED STATES PATENT OFFICE.

HENRY A. WILBERG, OF NOME, NORTH DAKOTA.

COMBINATION ATTACHMENT FOR PLOWS.

1,005,389.   Specification of Letters Patent.   Patented Oct. 10, 1911.

Application filed September 9, 1910. Serial No. 581,135.

*To all whom it may concern:*

Be it known that I, HENRY A. WILBERG, a citizen of the United States, residing at Nome, in the county of Barnes and State of North Dakota, have invented certain new and useful Improvements in Combination Attachments for Plows; and I do hereby declare the following to be a full, clear, and exact description of the invention, such as will enable others skilled in the art to which it appertains to make and use the same.

This invention relates to a combination surface and sub-surface packer attachment for plows, the object being to provide a device which can be connected to the frame of any of the well-known makes of plows now in use, so that the soil will be packed as it is turned over in order to prevent the moisture from escaping, and to save going over the field with a harrow or roller.

Another object of my invention is to provide a packer which comprises a series of wheels having V-shaped rims for packing the sub-soil, and a V-shaped projection for packing the surface, whereby the ground will be placed in condition to receive the seed.

A still further object of my invention is to provide an attachment which is exceedingly simple and cheap in construction, and one which is provided with means for carrying weights or removing stones from the field.

With these objects in view, the invention consists in the novel features of construction, combination and arrangement of parts, hereinafter fully described and pointed out in the claim.

In the drawing forming a part of this specification:—Figure 1 is a perspective view of my improved attachment. Fig. 2 is a side elevation of one of the packing wheels. Fig. 3 is a top plan view of the attachment showing the box removed.

In carrying out my improved invention, I employ a pair of frames 1 provided with forwardly projecting apertured lugs 2, in which is secured a cross bar 3 by pins 4, and adjustably mounted thereon is a coupling 5, in which is pivotally mounted a connecting bar 6, which is secured therein by an eye bolt 7, to which is connected the eye of a connecting bar 8, said bars being adapted to be secured to the frame of a plow of any construction by brackets 9 carried by eyes formed at the ends, as clearly shown.

The frames 1 are provided with bearings 10, in which is mounted a shaft 11 carrying a series of packing wheels 12, which are provided with rims 13 substantially V-shaped in cross section, and said rims carry V-shaped lugs 14, being triangular in cross section with the altitude of the triangle in radial lines and their apices outward for the purpose later described.

When the attachment is secured in position to a plow, the wheels travel over the soil turned up by the plow in such a manner that the rims will penetrate to the proper depth so that their edges will cut into and, owing to their V-shape, will pulverize and pack the sub-soil, and the lugs 14 will owing to their peculiar shape as before described pack the surface, in such a manner that it is not necessary to harrow the ground after being plowed. The frames 1 are adapted to carry a box 15 to receive stones picked up off the field, or weights can be placed in the box in order to throw the wheels into the ground the desired depth.

What I claim is:—

A packer attachment in the rear of a plow comprising two triangular side frames having their apices downward and provided with bearings at said apices and horizontal forwardly projecting lugs near their upper edges with lateral apertures, a box mounted on top of these frames, a shaft journaled in the bearings at the apices of the frames, packing disks on the shaft, a cross bar secured in the lateral apertures of the frames and having a central, forwardly projecting coupling, a coupling bar having an end with an eye inserted in the coupling, an eye bolt passed downward through the coupling and bar, a second coupling bar having an eye engaging the eye of the eyebolt, and a bracket for attachment to the outer end of each coupling bar for attachment to a plow.

In testimony whereof I have signed my name to this specification in the presence of two subscribing witnesses.

HENRY A. WILBERG.

Witnesses:
 L. HOGSTAD,
 BERNARD JOHNSON.

---

Copies of this patent may be obtained for five cents each, by addressing the "Commissioner of Patents, Washington, D. C."